United States Patent [19]

Eto et al.

[11] Patent Number: 4,763,745

[45] Date of Patent: Aug. 16, 1988

[54] MOTOR VEHICLE WITH DRIVING STATUS DETECTION DEVICE

[75] Inventors: Kunihiko Eto, Toyota; Yutaka Mori, Okazaki; Akihiro Oono, Okazaki; Kazumasa Kodama, Okazaki, all of Japan

[73] Assignee: Toyoda Koki Kabushiki Kaisha, Kariya, Japan

[21] Appl. No.: 865,337

[22] Filed: May 21, 1986

[30] Foreign Application Priority Data

May 24, 1985 [JP] Japan .................................. 60-112905

[51] Int. Cl.$^4$ ........................ B62D 6/02; G05D 16/00
[52] U.S. Cl. ..................................... 180/143; 180/282;
280/707; 364/174; 364/426
[58] Field of Search ............... 180/141, 142, 143, 282;
180/271; 280/707; 364/424.1, 424, 426, 174,
183, 130, 148; 318/587

[56] References Cited

U.S. PATENT DOCUMENTS

| | | | |
|---|---|---|---|
| 4,071,109 | 1/1978 | Ezoe | 180/143 |
| 4,293,844 | 10/1981 | Ruhl | 180/282 |
| 4,439,824 | 3/1984 | Mayer | 364/424 |
| 4,471,437 | 9/1984 | Yoshino | 364/424.1 |
| 4,498,036 | 2/1985 | Salemka | 364/183 |
| 4,506,909 | 3/1985 | Nakashima et al. | 280/707 |
| 4,542,460 | 9/1985 | Weber | 364/424 |
| 4,566,718 | 1/1986 | Kanai | 280/707 |
| 4,574,905 | 3/1986 | Asano et al. | 180/142 |
| 4,593,358 | 6/1986 | Takeshima | 364/424 |
| 4,602,695 | 7/1986 | Takeshima et al. | 180/143 |
| 4,622,865 | 11/1986 | Itoh | 364/424.1 |
| 4,626,994 | 12/1986 | Yabe et al. | 364/424 |
| 4,662,466 | 5/1987 | Eto et al. | 180/142 |

Primary Examiner—John J. Love
Assistant Examiner—Everett G. Diederiks, Jr.
Attorney, Agent, or Firm—Oblon, Fisher, Spivak, McClelland & Maier

[57] ABSTRACT

A motor vehicle is provided with a driving status discrimination device, which includes a detector for detecting a parameter signal (e.g., vehicle speed, engine rotational speed, the opening degree of an engine throttle valve, or the like) relating to the driving speed of the motor vehicle at a predetermined interval, and a microcomputer for processing the parameter signals input thereto. The microprocessor calculates a differentiated value of the parameter signal and stores the differential value in a memory device. The memory device has a plurality of memory locations each storing the differential value. The microprocessor futher calculates an integrated value of a plurality of differentiated values stored in the memory device and discriminates various driving status from one another (e.g., a mountain road driving from a high speed driving) based upon the calculated integrated value.

10 Claims, 7 Drawing Sheets

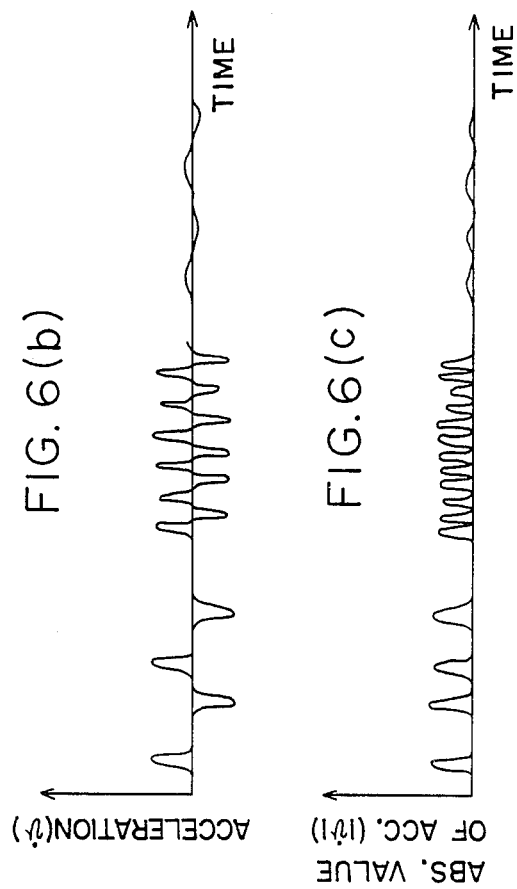
FIG.6(a)
FIG.6(b)
FIG.6(c)
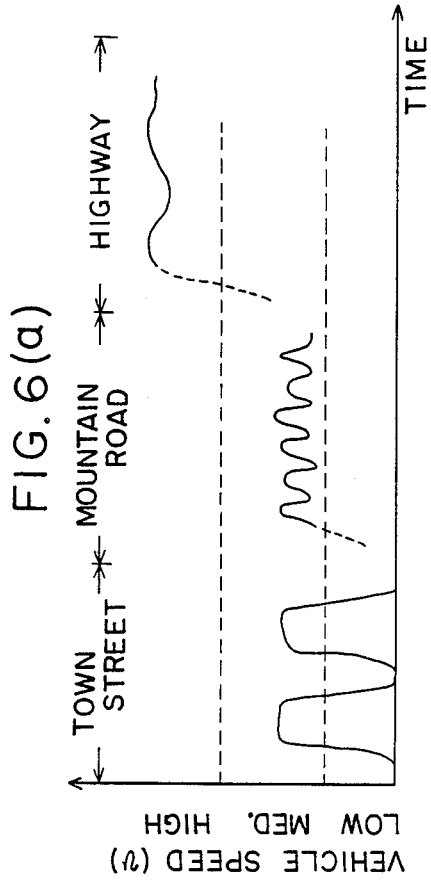
FIG.5(a)
FIG.5(b)

MOTOR VEHICLE WITH DRIVING STATUS DETECTION DEVICE

BACKGROUND OF THE INVENTION

1. Field of the Invention

The present invention relates to a motor vehicle having a driving status detection device for use in controlling a power steering device, suspension mechanisms or the like in accordance with the driving status of the motor vehicle.

2. Discussion of the Prior Art

Generally, the driving status of a motor vehicle is judged based upon the vehicle speed. In a known power steering device, for example, the result of such a judgement is utilized to control the assisting power in such a manner that the steering wheel is made light during a low speed running and heavy during a high speed running.

In the prior art wherein the driving status is judged based upon the vehicle speed as described above, the assisting power control, for instance, has such a problem that the control pattern of the assisting power relative to the vehicle speed, steering angle and the like is invariable regardless of whether the vehicle runs on a mountain road or a town street, thereby making it impossible to obtain an assisting power which meets the vehicle driving status, such as town street driving, high speed driving, mountain road driving, or the like. A similar problem also arises in controlling the height of a vehicle or the rigidity or shock absorption capability of suspension mechanisms.

To solve the aforementioned problems, there has been developed a steering power control system wherein a plurality of control patterns defining various assisting powers are provided to be manually selected depending upon the driver's preference or the vehicle driving status. However, the manual selection of such control patterns disadvantageously causes the vehicle driver to make a correct judgement of the driving status as well as to do a timely manipulation, and the automatic judgement of the vehicle driving status is therefore needed to obviate the drawbacks attributed to the nature of manual selection.

SUMMARY OF THE INVENTION

Accordingly, it is a primary object of the present invention to provide a motor vehicle having a driving status detection device capable of automatically and reliably detecting the vehicle driving status.

Another object of the present invention is to provide a motor vehicle having a driving status detection device of the character set forth above which has makes it possible to distinctly discriminates a mountain road driving from other driving statuses such as town street driving and high speed driving.

A further object of the present invention is to provide a motor vehicle having a driving status detection the character set forth above which can be used in discriminating a gentle driving from an aggressive or rough driving in a certain driving status such as high speed driving.

Briefly, a motor vehicle according to the present invention is provided with a driving status detection device comprising a signal detector for detecting a parameter signal relating to the driving speed of the motor vehicle, a first calculation device for calculating a differentiated value of the parameter signal, and a second calculation device for calculating an integrated value of a plurality of differentiated values each calculated by the first calculation device.

With this configuration, variation rates are calculated of a plurality of changes in the vehicle speed performed while the vehicle runs for a predetermined time period or through a predetermined distance. The variation rates are integrated for a total value which represents an entire trend of the changes in vehicle speed within a certain driving interval. Since various driving statuses such as town street driving, high speed driving and mountain road driving respectively have distinctive entire trends as to the change in vehicle speed, the driving statuses can be reliably discriminated from one another by reference to the total value.

BRIEF DESCRIPTION OF THE ACCOMPANYING DRAWINGS

The foregoing and other objects, features and many of the attendant advantages of the present invention will be readily appreciated as the same becomes better understood by reference to the following detailed description of the preferred embodiments, wherein like reference numerals designate identical or corresponding parts throughout the several views, and in which.

Figure 1:
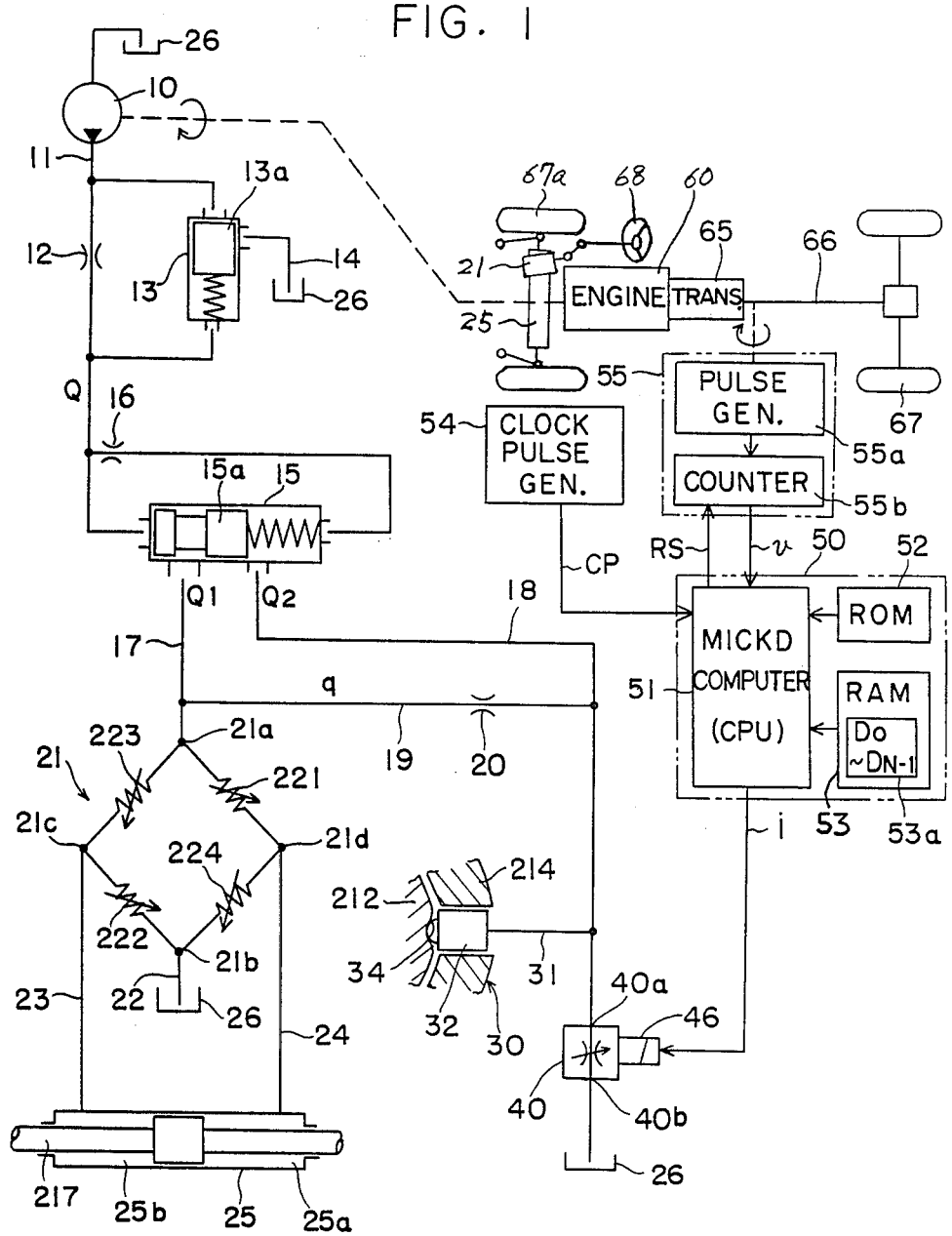
FIG. 1 is a hydraulic circuit diagram of a power steering system, also showing a block diagram of an assisting power controller which incorporates therein a driving status detection device according to the present invention.
Figure 4A:
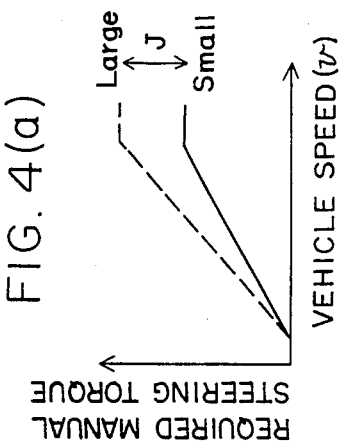
Figure 4B:
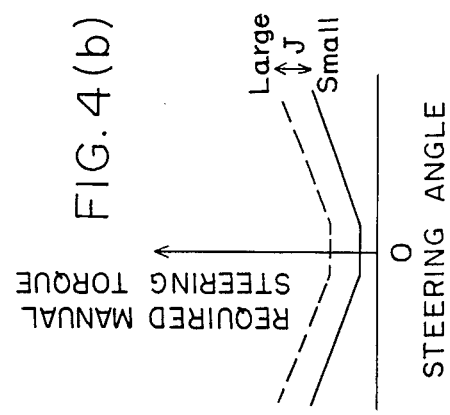
Figure 7:
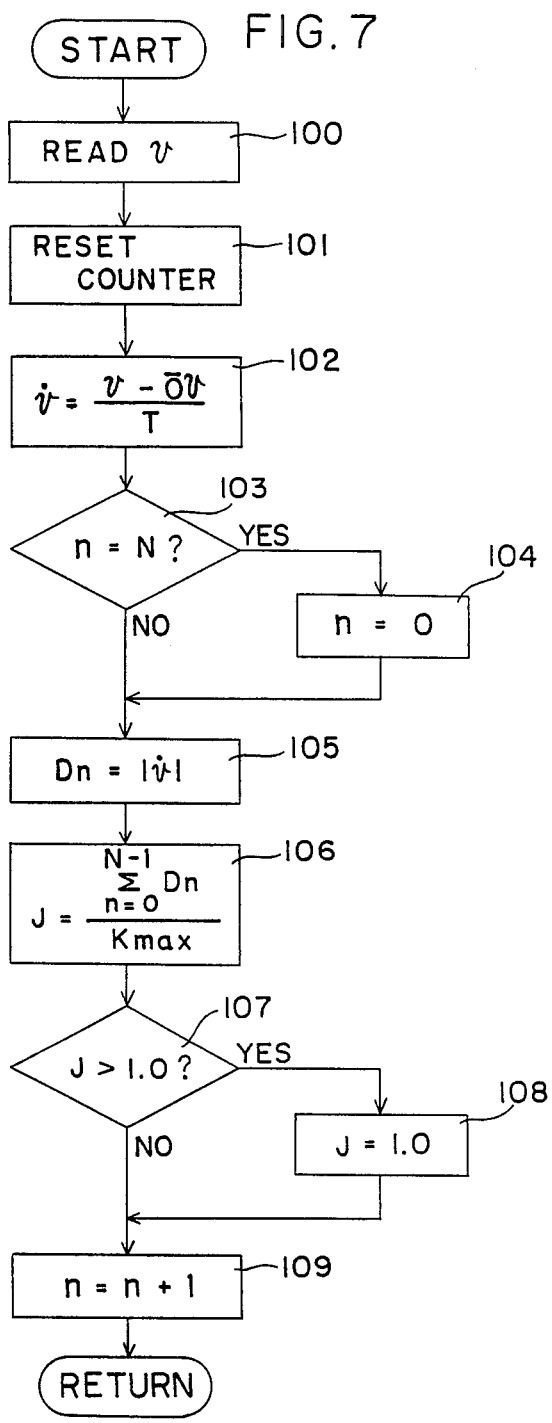
Figure 8:
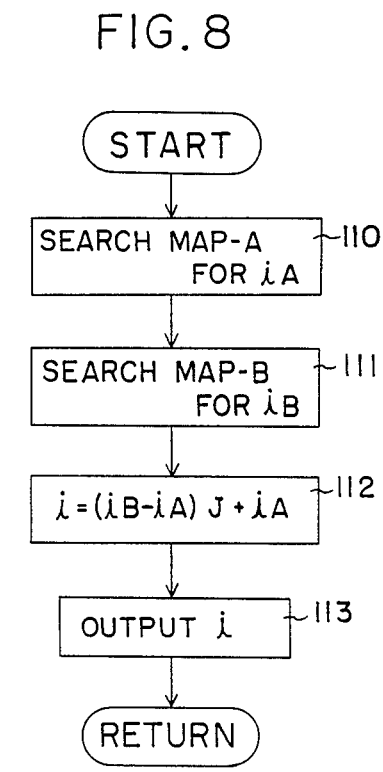
Figure 11:
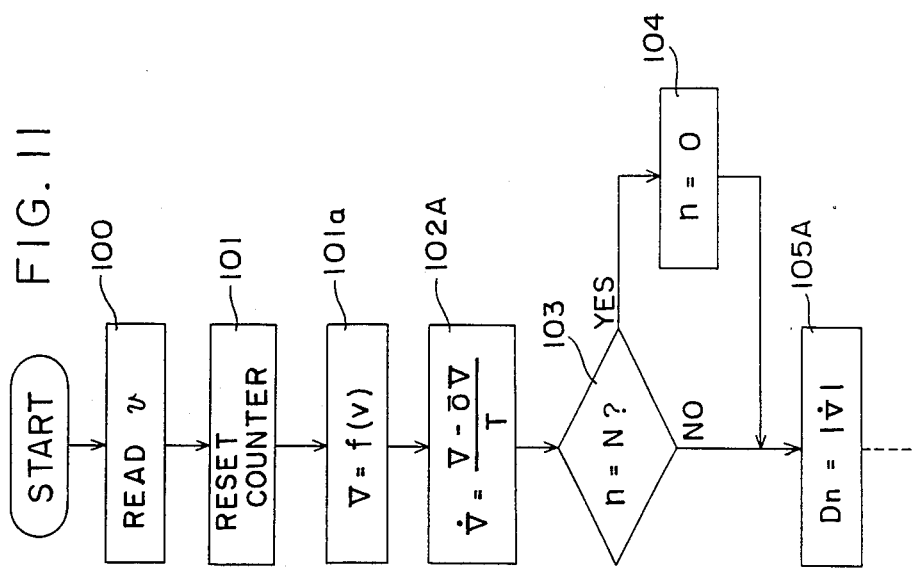
Figure 9:
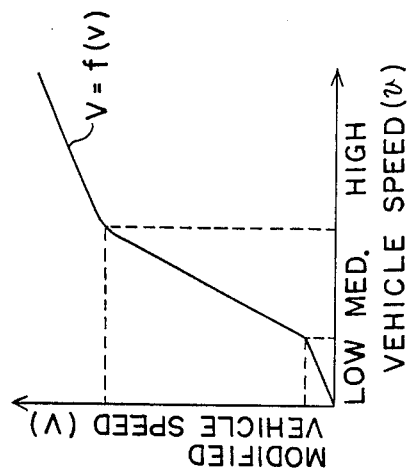
Figure 10:
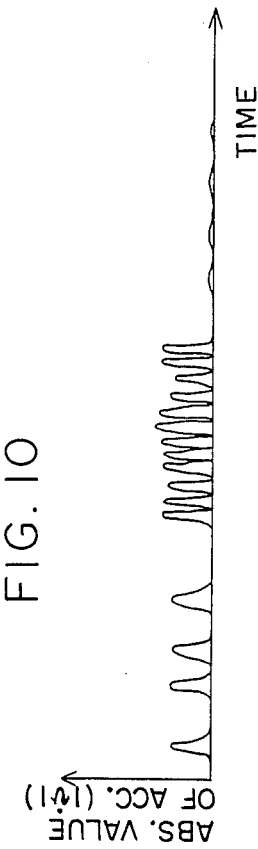
Figure 13:
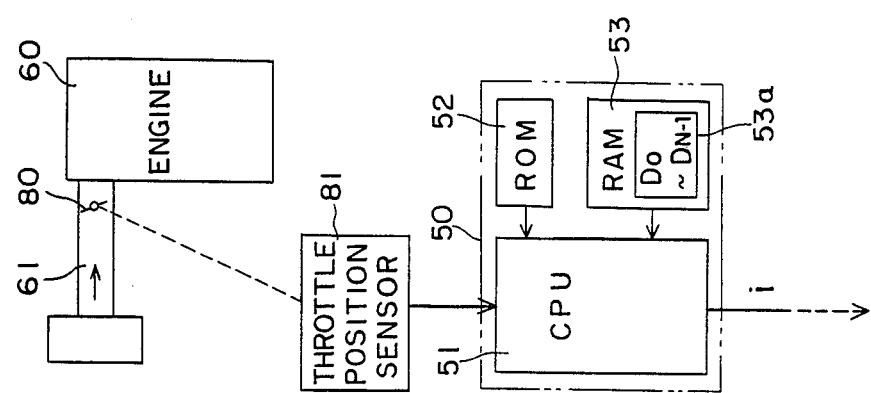
Figure 12:
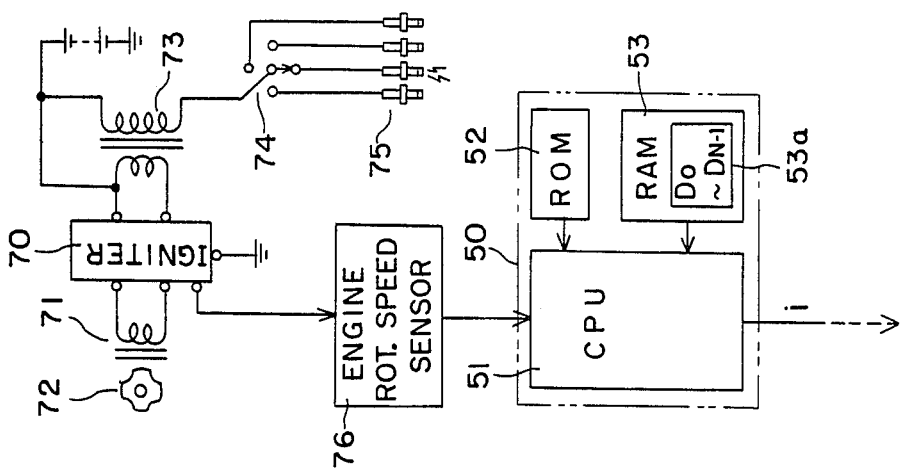

FIGS. 4(a) and 4(b) are graphs respectively showing variation characteristics of required manual steering torque relative to vehicle speed and steering wheel angle;

FIGS. 5(a) and 5(b) are graphs respectively showing variation characteristics of electric current relative to vehicle speed in town street driving and mountain road driving;

FIGS. 6(a) through 6(c) are graphs respectively showing variations of vehicle speed (v), acceleration ($\dot{v}$) and the absolute value ($|\dot{v}|$) of acceleration ($\dot{v}$);

FIG. 7 is a flow chart of a system program executed by a microcomputer shown in FIG. 1 for discriminating driving statuses of the vehicle;

FIG. 8 is a flow chart of another system program executed by the microcomputer for obtaining an electric current to be applied to the flow volume control valve;

FIG. 9 is a graph showing a characteristic plotted in accordance with a functional formula which is used to modify the signal from a vehicle speed sensor shown in FIG. 1;

FIG. 10 is a graph showing the variation of the absolute value of acceleration calculated based on the modified vehicle speed signal;

FIG. 11 is a partial flow chart of a system program modified from that shown in FIG. 7 for discriminating driving statuses of the vehicle based on the modified vehicle speed signals;

FIG. 12 is a block diagram of another input signal detection means used in place of that shown in FIG. 1;

FIG. 13 is a block diagram of still another input signal detection means; and

Figure 14:
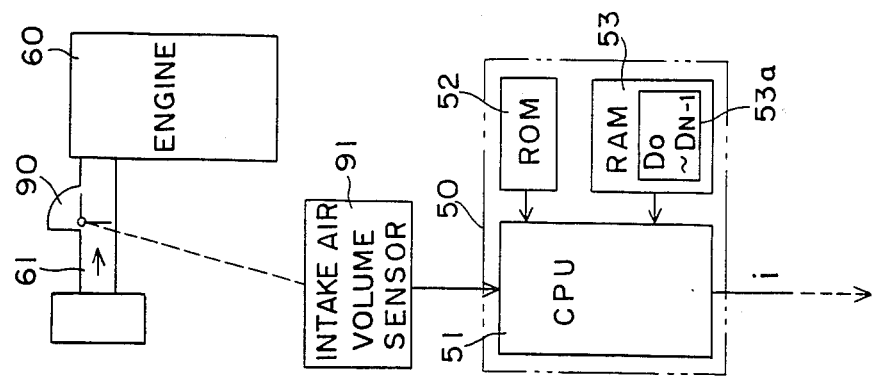

FIG. 14 is a block diagram of a further input signal detection means.

DETAILED DESCRIPTION OF THE PREFERRED EMBODIMENTS

Referring to the drawings, a motor vehicle according to the present invention is embodied by that having a power steering system which is provided with one of various assisting power controllers as described and illustrated herein. In FIG. 1, a motor vehicle is illustrated having a pair of rear wheels 67 drivin by an engine 60 through a transmission 65, an output shaft 66 and the like and another pair of front wheels 67a steerable by a power steering system represented in the form of a hydraulic circuit diagram therein. The power steering system includes a metering orifice 12 and a bypass valve 13 which are provided in parallel relation with each other on an outlet line 11 extending from a supply pump 10 such as vane pump driven by an automotive engine 60. A control spool 13a is responsive to the pressure difference across the metering orifice 12 to return an excess part of pressurized fluid from the pump 10 to a reservoir 26 when the volume of pressurized fluid from the pump 10 increases over a predetermined value. Thus, the bypass valve 13 operates to supply a flow divider 15 with pressurized fluid of a predetermined flow volume Q. In the case that the pump 10 is driven by a constant speed electric motor to deliver pressurized fluid of a predetermined flow volume, the bypass valve 13 can be omitted.

The flow divider 15 includes a control spool 15a movable in response to the pressure difference across an invariable throttle 16 and, by the action of the control spool 15a, divides the pressurized fluid of the predetermined flow volume (Q) supplied thereto into a first constant flow volume (Q1) delivered to a servovalve line 17 and a second constant flow volume (Q2) delivered to a reaction power control line 18. The servovalve line 17 is connected with a power cylinder 25 through a servovalve 21, while the reaction power control line 18 is connected with a reaction power mechanism 30 and an electromagnetic flow volume control valve 40 described later in more detail. Between the servovalve line 17 and the reaction power control line 18, there is interconnected a communication line 19, on which an invariable throttle 20 is provided.

Figure 2:
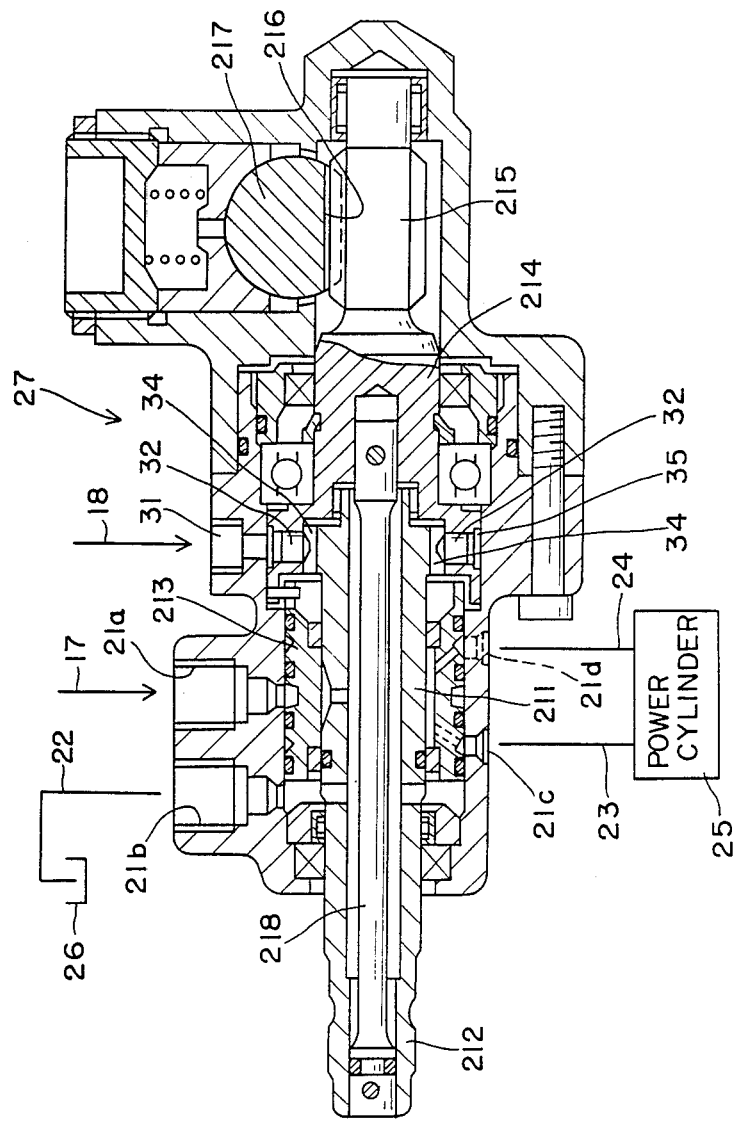
FIG. 2 is a sectional view of a power steering gear mechanism constituting the power steering system shown in FIG. 1.

FIG. 2 shows a power steering gear mechanism 27 incorporating the servovalve 21 and the reaction power mechanism 30. The servovalve 21 comprises a rotor portion 211 integral with an input shaft 212 and a valve sleeve 213 receiving therein the rotor portion 211. The sleeve 213 is rotatable bodily with an output shaft 214, which is interconnected with the input shaft 212 by means of a torsion bar 218. The output shaft 214 is formed with a pinion 215, which meshes with a rack 216 formed on a rod 217 of the power cylinder 25. The rotor portion 211 cooperates with the valve sleeve 213 to provide two pairs of variable throttles 221-224 at a circumferential mating portion therebetween, as schematically illustrated in FIG. 1.

When a steering wheel 68 connected to the input shaft 212 is at a neutral position, the throttles 221 and 223 for intake control have the same degree of opening and the throttles 222 and 224 for exhaust control have the same degree of opening. Thus, pressurized fluid admitted into the servovalve 21 from a supply port 21a is divided into two streams of equal flow volumes which respectively flow along a right passage including the throttles 221, 224 and a left passage including the throttles 223, 222. This makes pressures at a pair of distribution ports 21c and 21d low and equal to each other, so that no operation of the power cylinder 25 is effected. Pressurized fluids respectively passing through the right and passages are returned from an exhaust port 21b to the reservoir 26 through a return line 22.

However, when the steering wheel 68 is turned in one direction, one pair of the throttles 221, 222 (or 223, 224) increase the degree of opening, while the other pair of the throttles 223, 224 (or 221, 222) decrease the degree of opening. Thus, a pressure difference occurs between the distribution ports 21d and 21c, and pressurized fluid admitted into the servovalve 21 flows through one of distribution passages 24 (or 23) into one of opposite chambers 25a (or 25b) of the power cylinder 25, while fluid in the other chamter 25b (or 25a) of the power cylinder 25 is returned through the other distribution passage 23 (or 24) to the reservoir 26. As the pressure at the supply port 21a increases in this state, a part (q) of the flow volume (Q) flowing through the servovalve line 17 flows into the communication line 19, whereby the flow volume of pressurized fluid which passes through the electromagnetic flow volume control valve 40 increases.

The reaction power mechanism 30 is primarily composed of a pair of plungers 32 movable radially of the input shaft 212 within holes diametrically formed in the output shaft 214 and a pair of cavities 34 diametrically formed at the external surface of the input shaft 212 for respective engagements with the plungers 32. The flow control valve 40 controls the pressure of fluid which is admitted from a port 31 into an annular chamber 35 to which the holes open at the rear ends of the plungers 32. Thus, the force with which each plunger 32 engages the cavity 34 corresponding thereto is varied to thereby change the torsion spring characteristic between the input and output shafts 212 and 214. Consequently, the operation characteristic of the servovalve 21 relative to the manual steering torque applied to the input shaft 212 through the steering wheel 68 can be varied by the operation of the reaction power mechanism 30.

Figure 3:
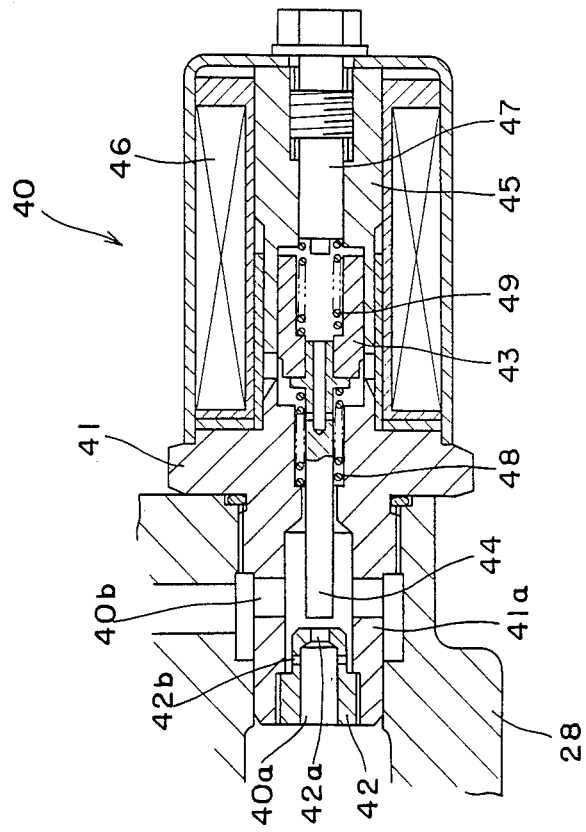
FIG. 3 is a sectional view of an electromagnetic flow volume control valve shown in FIG. 1.

Referring to FIG. 3 illustrating the detail of the aforementioned flow control valve 40, a valve body 41 is formed at an end of its sleeve portion 41a with a hole (not numbered), into which threadedly fitted is a union 42 having a throttle hole 42a. A first port 40a and a second port 40b are provided to communicate with each other through the throttle hole 42a. The valve body 41 fixedly carries a yoke 45 at a side opposite to the sleeve portion 41a. A spool 43 is axially slidably received in the yoke 45. A valve rod 44 secured to the spool 43 is in axial alignment with the throttle hole 42a. The spool 43 is carried between the valve body 41 and an adjusting screw 47 threaded into the yoke 45 through a pair of springs 48 and 49. The adjusting screw 47 is adjusted in advance so that the left end of the valve rod 44 is normally spaced from the throttle hole 42a of the union 42 so as to fully open the throttle hole 42a. However, as a solenoid 46 surrounding the yoke 45 is energized, the spool 43 is displaced toward the left as viewed in FIG. 3 by the amount corresponding to the electric current applied to the solenoid 46, so as to gradually decrease the opening degree of the throttle hole 42a. The union 42 is formed with an invariable small throttle 42b which secures the communication between the ports 40a and 40b even in the state that the throttle hole 42a is completely closed. The flow volume control valve 40 as constructed above is mounted with the sleeve portion 41a being threadedly engaged with an attaching base 28 such as valve housing.

In power steering systems of the aforementioned type, it has been a practice to vary the opening degree of the flow volume control valve 40 with changes in the vehicle speed only. According to this control principle, the opening degree of the flow volume control valve 40 is decreased as the vehicle speed increases, and the volume of fluid which flows across the flow volume control valve 40 is increased as the steering wheel angular position increases. Thus, the steering wheel 68 becomes heavier with increases in the vehicle speed as well as in the steering wheel angle, as shown in the solid lines in FIGS. 4(a) and 4(b). However, according to the known control method, the control pattern which is determined only by the solid line in each of FIGS. 4(a) and 4(b) cannot be changed even when the driving status of the vehicle changes, for example, from a mountain road driving to a town street driving and vice versa or from a gentle driving to a rough or aggressive driving and vice versa. In the illustrated embodiment, the opening degree of the flow volume control valve 40 is varied by an assisting power controller 50 shown in FIG. 1 based upon the both of an integrated value of the absolute values of accelerations and the vehicle speed so that the control pattern can be varied based upon the driving road condition or the driving manner of the driver.

The assisting power controller 50 provided for such purpose is primarily composed of a microcomputer (hereafter referred to as "CPU") 51, a read-only memory (as "ROM") 52, a random access memory (as "RAM") 53, and a vehicle speed sensor 55 connected to the CPU 51. The speed sensor 55 comprises a pulse generator 55a which is drivingly connected to an output shaft 66 of a transmission 65 of the vehicle and a counter 55b for detecting the vehicle speed (v) by counting pulse signals from the pulse generator 55a. As described later, the counter 55b is reset in response to a reset signal RS which is output from the CPU 51 at such a predetermined time interval as determined by clock pulses CP from a clock pulse generator 54 connected to the CPU 51. The CPU 51 calculates an integrated value (hereafter referred to as "driving etatus index (J)") of absolute values of vehicle accelerations in response to the vehicle speed signal (v) and controls the electric current (i) to be applied to the solenoid 46 in accordance with the vehicle speed (v) and the driving status index (J).

Generally, as shown in FIG. 6(a), acceleration and deceleration in mountain road driving are repeated at a high frequency within a medium speed range. In high speed driving on highways, although acceleration and deceleration are repeated as well, the degree and frequency of the acceleration and deceleration are smaller than those of the acceleration and deceleration in mountain road driving. On the other hand, in town street driving, acceleration to medium speeds from the stop status caused due to traffic signals and deceleration to stop status are performed at a small frequency. Thus, the curves representing changes in the acceleration ($\dot{v}$) and the absolute value ($|\dot{v}|$) thereof relative to time in each of town street driving, mountain road driving and high speed driving are plotted as shown in FIGS. 6(b), 6(c). That is, the curve representing the change in the absolute value ($|\dot{v}|$) has a plurality of high peaks which appear at a short time interval in mountain road driving, a few number of low flat peaks in high speed driving, and a few number of high peaks which are hardly different from those in mountain road driving in level, in town street driving. Consequently, the integrated value of the absolute values ($|\dot{v}|$) of accelerations ($\dot{v}$) within a predetermined time period or driving distance, that is to say, the aforementioned driving status index (J) is the largest in mountain road driving, smaller in town street driving than that in mountain road driving, and the smallest in high speed driving, as clearly noticed from FIG. 6(c).

Further, even if the road condition does not change while the vehicle runs a mountain road or a town street, the peaks of the curve representing the variation of absolute values ($|\dot{v}|$) of accelerations ($\dot{v}$) in aggressive driving become higher in level than those in gentle driving and hence, the integrated value of the absolute values ($|\dot{v}|$),i.e., the driving status ( index (J) in aggressive driving becomes larger than that in gentle driving. Although as mentioned earlier, the driving status index (J) in typical town street drivings is larger than that in highway drivings, the driving status index (J) in gentle drivings on town streets at very low speeds is extremely decreased to approach zero.

The ROM 52 stores therein in the form of characteristic maps control patterns each defining various electric currents which are used to modulate that applied to the solenoid 46 of the flow volume control valve 40. FIGS. 5(a) and 5(b) graphically show the control patterns. More specifically, FIG. 5(a) represents the variation characteristic of first electric current (iA) in connection with the change in the vehicle speed (v) when the driving status index (J) is zero (namely, during town street driving or gentle driving at very low speeds). The first electric current (iA) is set such that it increases at a predetermined rate with an increase in the vehicle speed (v), but that it does not vary either in a low speed range or in a high speed range. FIG. 5(b) shows the variation characteristic of second electric current (iB) in connection with the change in the vehicle speed (v) when the driving status index (J) is one (1) (namely, during the driving on mountain road with many curves). The second electric current (iB) is set such that like the first electric current (iA), it varies with an increase in the vehicle speed (v), but that its value is larger than the value of a corresponding first electric current (iA).

The RAM 53 has a plurality (N in number) of storage locations (buffer registers) D0 to DN-1 for storing a plurality of accelerations. The ROM 52 has further stored system control programs therein. When operated in accordance with the system control programs, the CPU 51 reads the vehicle speed (v) from the vehicle speed sensor 55 at a predetermined time interval, calculates an acceleration (v) and stores the calculated acceleration ($\dot{v}$) p in one of the buffer D0 to DN-1 registers. The CPU 51 then calculates the driving status index (J) based upon a pluraliyt of accelerations ($\dot{v}$) stored in the buffer registers D0 to Dn1 , searches the characteristic maps shown in FIGS. 5(a) and 5(b) for first and second electric currents (iA), (iB) each corresponding to the detected vehicle speed (v) and then, calculates an objective electric current (i) based upon the calculated driving status index (J) and the searched electric currents (iA), (iB) for application to the solenoid 46 of the flow volume control valve 40.

In this manner of control, as the driving status index (J) becomes larger, the objective electric current (i)

applied to the solenoid 46 becomes larger thereby to decrease the opening degree of the flow volume control valve 40. Thus, the pressure of fluid acting on the reaction power mechanism 30 increases, and the required manual steering torque determined based on the vehicle speed (v) and the steering angle is varied toward the tend to increase.

The operation of the power steering system as constructed above will be described hereafter with reference to flow charts shown in FIGS. 7 and 8.

While the vehicle is in a certain driving status, the vehicle speed (v) which varies from time to time is detected by the vehicle speed sensor 55. The CPU 51 executes the program shown in FIG. 7 in response to each of clock pulses CP which input thereto from the clock pulse generator 54 at a predetermined time interval. First of all, the CPU 51 reads the vehicle speed (v) stored in the counter 55b in step 100 and outputs a reset signal RS to the counter 55b in step 101 so as to enable the same to detect the vehicle speed (v) in a subsequent time period. The CPU then calculates an acceleration (v) by differentiating the vehicle speed (v) in step 102, using the following equation:

$$\dot{v} = (v - \overline{o v})/T$$

where $\overline{ov}$ represents the vehicle speed at last time.

Step 103 is then executed to compare a value (n) in a sampling counter (not shown) provided in the RAM 53 with the number (N) of the buffer registers D0 to DN1. Unless "n" has reached "N", then step 105 is executed to store the absolute value ($|\dot{v}|$) of the calculated acceleration ($\dot{v}$) in the n-th buffer register DN. If n =N in step 103, the sampling counter is reset to indicate zero before step 105 is reached. Through the steps 103 to 105, absolute values ($|\dot{v}|$) of the accelerations ($\dot{v}$) detected at the predetermined time interval are successively stored in the buffer registers D0 to DN-1, and after all of the buffer registers become full, the renewal of the stored data is executed from the first buffer register D0 (hence, on a first-in first-out basis).

In step 106, the CPU 51 successively reads out all of the stored data (i.e., absolute values ($|\dot{v}|$) of accelerations ($\dot{v}$)) in the buffer registers D0 to Dn-1 and calculates the driving status index (J) using the following equation:

$$J = \sum_{n=0}^{N-1} Dn/K\text{max}$$

where Kmax represents a constant (e.g., 50) which is experimentally obtained to make the index (J) nearly equal to 1 in the driving of a mountain road with many curves.

Subsequently, step 107 is executed to ascertain whether the driving status index (J) is 1 or larger than 1. If the index (J) is larger than 1, it is set to 1 in step 108. The CPU 51 then increments the value (n) in the sampling counter in step 109 and discontinues the execution of the program shown in FIG. 7 until it receives a successive clock pulse CP from the clock pulse generator 54.

Each time the execution of the program shown in FIG. 7 is completed once (or predetermined several times as the case may be), the CPU 51 initiates the execution of the program shown in FIG. 8. First of all, the CPU 51 executes step 110 to search the characteristic map A in the ROM 52 shown in FIG. 5(a) for a first electric current (iA) corresponding to the vehicle speed (v) detected in step 100 and then, executes step 111 to search the characteristic map B shown in FIG. 5(b) for a second electric current (iB) corresponding to the vehicle speed (v). In step 112, these electric currents (iA) and (iB) are substituted into an equation noted below for an objective electric current (i), which is then output to be applied to the solenoid 46 of the flow volume control valve 40 in step 113.

$$i = (iB - iA)J + iA$$

Upon completion of step 113, CPU 51 terminates the execution of the program shown in FIG. 8.

Thereafter, each time the CPU 51 receives the clock pulse CP at the predetermined time interval, it repeats the executions of the aforementioned system programs. This results in adjusting the opening degree of the flow volume control valve 40 based upon the vehicle speed (v) and the driving status index (J), whereby the steering wheel 68 can be turned with a desired manual steering torque meeting the current driving status of the vehicle. That is, as shown in each of FIGS. 4(a) and 4(b), the manual steering torque required at each vehicle speed can be increased from that determined by the solid line to that determined by the broken line as the driving status index (J) becomes larger. Consequently, the pattern in the assisting power control can be flexibly varied within a range defined by the solid and broken lines in each of FIGS. 4(a) and 4(b).

It is to be noted herein that one form of variation may be provided by replacing the clock pulse generator 54 with means for inputting an interrupt signal each time the vehicle runs a predetermined distance. It is also to be noted that the calculation of the driving status index (J) in step 106 may be performed not based upon all of the stored data in the N-number buffer registers D0 to DN1, but based upon those which belong to a predetermined distribution range or interval.

Although in the above-described embodiment, the vehicle speed (v) is directly differentiated for an acceleration ($\dot{v}$) it may be modified using an equation V=f(v) wherein as shown in FIG. 9, the gradient of the plotted curve is large within a medium speed range which is used at the largest frequency in mountain road drivings, but is small within each of a high speed range and a low speed range. Where a modified acceleration ($\dot{V}$) is calculated by differentiating the modified vehicle speed (V) and the driving status index (J) is calculated based upon the modified accelerations ($\dot{V}$) in the same manner as described above, the discrimination of the mountain road driving from other driving statuses, particularly from the town street driving becomes easier and more reliable. That is, since the modified accelerations ($\dot{V}$) each calculated based upon a modified vehicle speed (V) as above are larger than those shown in FIG. 6(c) in mountain road driving, are smaller than those acceleration in high speed driving and are the same in level as those accelerations in town street driving, the differences between the driving status indexes (J) in the various driving statuses can be magnified. Numerous modified vehicle speeds (V) which are calculated by the formula V=f(v) in advance may be stored in the ROM 52 in the form of a characteristic map.

FIG. 11 shows a part of a flow chart of a program which is used in another embodiment referred to above with reference to FIGS. 9 and 10. As different from the program shown in FIG. 7, the program shown in FIG.

11 includes step 101a which follows the step 101 to modify the vehicle speed (v) in accordance with the functional formula V =f(v). Further, instead of steps 102 and 105 in FIG. 7, there are replaced steps 102A and 105A wherein "v" and "v̇" in steps 102 and 105 are replaced by "V" and "V̇".

In the above-described embodiment, each calculated deceleration (i.e., each differentiated value with minus symbol obtained in step 102) is converted into a corresponding acceleration by taking the absolute value of the calculated deceleration. However, in calculating the driving status index (J) in step 106, calculated decelerations (−v̇) may be omitted and accelerations (v̇) only may be used.

Further, in the above-described embodiment, the town driving can be reliably discriminated from the high speed driving since the driving status index (J) in the town street driving is considerably larger than that in the high speed driving. However, in a smooth or gentle driving on town streets at very low speeds, the index (J) approaches zero (0) thereby having no difference from that in the high speed driving, and this makes it difficult to discriminate both of the driving statuses from each other. In this case, the vehicle speed may be taken as a secondary factor to discriminate the gentle driving on town streets at very low speeds from the high speed driving.

In lieu of the vehicle speed as used in the aforementioned embodiment, various other information relating to the vehicle speed may be utilized as an input parameter for discrimination of the driving statuses. FIGS. 12 through 14 respectively illustrate modified embodiments utilizing as such an input parameter other information than the vehicle speed.

A modified embodiment shown in FIG. 12 utilizes the rotational speed of the engine 60 of the motor vehicle as the parameter relating to the vehicle speed. In this embodiment, an engine rotational speed sensor 76 is provided connected to an igniter 70. As is well known in the art, the igniter 70 is driven by a signalizing rotor 72 provided on a cam shaft through a pickup coil 71 for causing through an ignition coil 73 and a distributor 74 a number of spark plugs 75 to fire selectively. An engine rotational speed signal from the sensor 76 is supplied to the CPU 51. In the same manner as described above, the CPU 51 calculates a differentiated value of the engine rotational speed and a driving status index (J) based upon a plurality of differentiated values so as to detect the driving status.

Referring to FIG. 13, another modified embodiment is shown utilizing as the input parameter relating to the vehicle speed the opening degree of a throttle valve 80 which controls the volume of fuel gas to the engine 60. More specifically, a throttle position sensor 81 for detecting the opening degree of the throttle valve 80 is provided connected mechanically with the throttle valve 80 which is disposed in a fuel gas passage 61 of the engine 60. In the same manner as described above, the CPU 51 calculates a differentiated value of each throttle position signal supplied from the position sensor 81 and a driving status index (J) so as to detect the driving status.

A further modified embodiment is shown in FIG. 14, wherein the intake air volume to the engine 60 is utilized as the input parameter relating to the vehicle speed. This embodiment is suitable to engines of the type having an electronic control fuel injection system (known as "EFI" to those skilled in the art). The injection system is provided in an intake air passage 61 to the engine 60 with an air flow meter 90, which is rotatable in proportion to the intake air volume charged to the engine 60. An air volume sensor 91 driven by the rotation of the flow meter 90 is connected to input an air volume signal to the CPU 51. The CPU 51 processes the air volume signal in the same manner as described above so as to detect the driving status.

Apparently, in any of the modified embodiments shown in FIGS. 12–13, either of the system control programs shown in FIGS. 7 and 11 can be used with a slight change (e.g., the omission of step 101).

Although the present invention has been described by way of the illustrated embodiments applied for control of a power steering system, it may otherwise be applicable to a height control, a suspension control or the like for motor vehicles.

Obviously, other numerous modifications and variations of the present invention are possible in light of the above teachings. It is therefore to be understood that within the scope of the appended claims, the present invention may be practiced otherwise than as specifically described herein.

What is claimed is:

1. A motor vehicle having a driving status detection device comprising:
   a speed signal detector for detecting a parameter signal proportional to the vehicle speed;
   acceleration calculation means operable at a plurality of predetermined intervals for calculating a differentiated value of said parameter signal for each interval detected by said speed signal detector with respect to time representing the acceleration of said vehicle, including data modifying means receiving said parameter signal for modifying the same in accordance with a functional formula so as to obtain a modified parameter signal, and differentiating means for calculating a differential value of said modified parameter signal obtained by said data modifying means, wherein said functional formula magnifies at a large magnification ratio said parameter signal which represents a vehicle speed belonging to a medium speed range and magnifies at a small magnification ratio said parameter signal which represents a vehicle speed belonging to either of low and high speed ranges; and
   driving status calculation means for calculating an integrated value of a plurality of said differentiated values successively calcualted by said acceleration calculation means, said integrated value representing the sum of accelerations given to said vehicle which is indicative of the driving status of said vehicle.

2. A motor vehicle having a driving status detection device comprising:
   a speed signal detector for detecting a parameter signal proportional to the vehicle speed;
   acceleration calculation means operable at a plurality of predetermined intervals for calculating a differentiated value of said parameter signal for each interval detected by said speed signal detector with respect to time representing the acceleration of said vehicle;
   wherein said differentiated value calculated by said acceleration calculation means represents an acceleration of said motor vehicle; and
   driving status calculation means for calculating an integrated value of a plurality of said differentiated values successively calculated by said acceleration calculation means, said integrated value representing the sum of accelerations given to said vehicle which is indicative of the driving status of said vehicle, including:
converting means for obtaining an absolute value of said acceleration calculated by said acceleration calculation means; and
integrating means for calculating an integrated value based on a plurality of said absolute values each obtained by said converting means.

3. A motor vehicle having a driving status detection device as set forth in claim 2, wherein:
said driving status calculation means includes means for dividing said integrated value by a constant obtained experimentally so as to calculate a driving status index which is used for discriminating said various driving statuses from one another.

4. A motor vehicle having a driving status detection device as set forth in claim 2, further comprising:
data storage means having a plurality of storage locations for storing said plurality of said absolute values each obtained by said converting means; and
data renewing means for successively renewing said absolute values stored in said data storage means, on a first-in first-out basis after all of said plurality of storage locations are occupied by said absolute values.

5. A motor vehicle having a driving status detection device as set forth in claim 2, wherein said speed signal detector comprises:
a speed sensor for detecting as said parameter signal the driving speed of said motor vehicle at said predetermined interval.

6. A motor vehicle having a driving status detection device as set forth in claim 1, wherein said speed detector comprises:
a detector for detecting as said parameter signal the rotational speed of an engine of said motor vehicle.

7. A motor vehicle having a driving status direction device as set forth in claim 2, wherein said speed signal detector comprises:
a detector for detecting as said parameter signal the opening degree of a throttle valve which controls the volume of fuel gas fed to an engine of said motor vehicle.

8. A motor vehicle having a driving status detection device as set forth in claim 2, wherein said speed signal detector comprises:
a detector for detecting as said parameter signal the volume of intake gas fed to an engine of said motor vehicle.

9. A motor vehicle having a power steering system of the type wherein an electromagnetic actuator controls the assisting power generated by a power cylinder in response to an electric current applied thereto, driving status detection means for detecting the driving status of said motor vehicle so as to output a driving status index representing the driving status, and electric current calculation means for calculating the electric current applied to said electromagnetic actuator based upon said driving status index and a parameter signal relating to the vehicle speed, said driving status detection means comprising:
a speed signal detector for detecting said parameter signal proportional to the vehicle speed;
acceleration calculation means operable at a plurality of predetermined intervals for calculating a differentiated value of said parameter for signal for each interval detected by said speed signal detector with respect to time; and
driving status calculation means for calculating an integrated value of a plurality of said differentiated values each calculated by said acceleration calculation means, said integrated value representing the sum of accelerations given to said motor vehicle.

10. A motor vehicle as set forth in claim 9, wherein said electric current calculation means comprises:
first memory means for storing a plurality of first electric currents in relation to various vehicle speeds in the form of a map;
second memory means for storing a plurality of second electric currents in relation to said various vehicle speeds in the form of a map, some of said second electric currents being different in level from those of said first electric currents respectively corresponding thereto with vehicle speed;
search means for searching said first and second memory means for one of said first electric current corresponding to said parameter signal and for one of said second electric currents corresponding to said parameter signal; and
calculation means for calculating said electric current to be applied to said electromagnetic actuator, based on said first and second electric currents searched for by said search means and said driving status index.

* * * * *